US012610282B2

(12) United States Patent
Feraboli

(10) Patent No.: US 12,610,282 B2
(45) Date of Patent: Apr. 21, 2026

(54) METHOD AND GATEWAY FOR OPTIMIZED ALLOCATION OF STATIONS USING AN 802.11AX STANDARD

(71) Applicant: SOFTATHOME, Colombes (FR)

(72) Inventor: Quentin Feraboli, Nanterre (FR)

(73) Assignee: SOFTATHOME, Colombes (FR)

( * ) Notice: Subject to any disclaimer, the term of this patent is extended or adjusted under 35 U.S.C. 154(b) by 329 days.

(21) Appl. No.: 18/260,446

(22) PCT Filed: Dec. 14, 2021

(86) PCT No.: PCT/EP2021/085666
§ 371 (c)(1),
(2) Date: Jul. 5, 2023

(87) PCT Pub. No.: WO2022/148613
PCT Pub. Date: Jul. 14, 2022

(65) Prior Publication Data
US 2024/0306174 A1 Sep. 12, 2024

(30) Foreign Application Priority Data

Jan. 8, 2021 (FR) ...................................... 2100150

(51) Int. Cl.
*H04W 28/16* (2009.01)
*H04W 72/0453* (2023.01)
*H04W 84/12* (2009.01)

(52) U.S. Cl.
CPC ....... *H04W 28/16* (2013.01); *H04W 72/0453* (2013.01); *H04W 84/12* (2013.01)

(58) Field of Classification Search
CPC . H04W 28/16; H04W 48/18; H04W 72/0453; H04W 84/12
See application file for complete search history.

(56) References Cited

U.S. PATENT DOCUMENTS

2018/0255555 A1* 9/2018 Rangaraj Manavalan ................. H04W 72/535
2021/0120454 A1* 4/2021 Chennichetty ....... H04B 7/0452
2022/0095206 A1* 3/2022 Vakil ..................... H04W 72/21

FOREIGN PATENT DOCUMENTS

EP 3058772 A1 8/2016
EP 2945332 B1 8/2017
WO 2017/160745 A1 9/2017

OTHER PUBLICATIONS

French Search Report received for Application No. 2100150, dated Sep. 23, 2021.

(Continued)

*Primary Examiner* — Pao Sinkantarakorn
(74) *Attorney, Agent, or Firm* — Greer, Burns & Crain, Ltd

(57) ABSTRACT

A method for station allocation using an 802.11ax standard in a network including at least one 802.11ax station implementing a service, a gateway communicating with an external network and a detection device detecting the station service. The method includes collecting station parameters, classifying the services of each station by class, each class containing a type of service; each class is assigned a resource unit and a number of stations, arranging the N classes on the size of the resource unit assigned to each class; and, when a station connects to the local network: identifying a dedicated class, corresponding to the station service, identifying a higher and a lower class than the dedicated class if existing, checking whether the maximum number of stations is reached in the higher, the dedicated or in the lower class; assigning the station to a resource unit of the first class in order.

12 Claims, 3 Drawing Sheets

(56) References Cited

OTHER PUBLICATIONS

International Search Report and Written Opinion received for PCT/EP2021/085666, mailed May 13, 2022.

* cited by examiner

[Fig. 1]
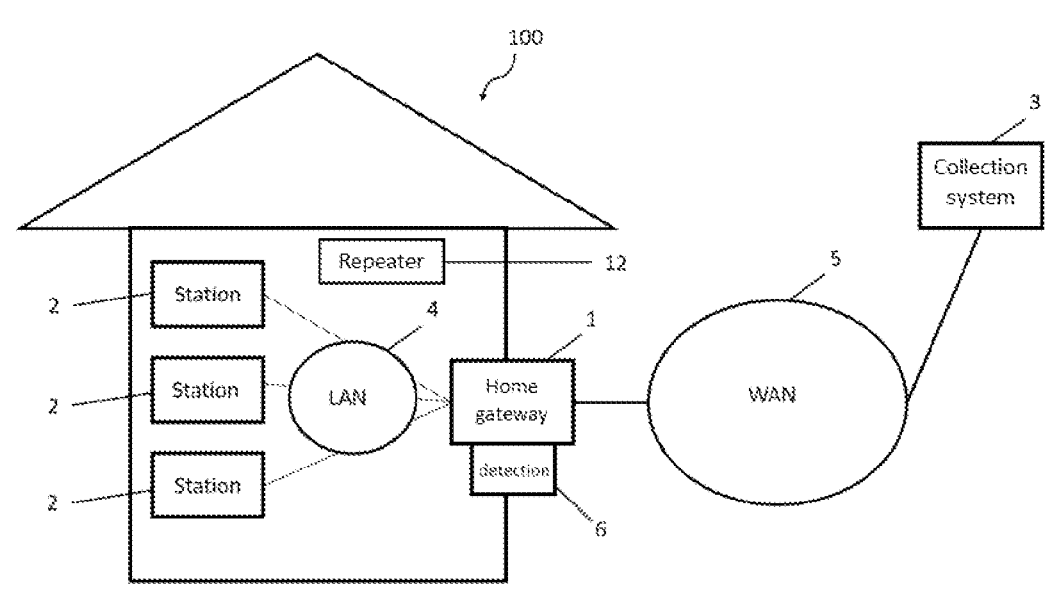
[Fig. 2]
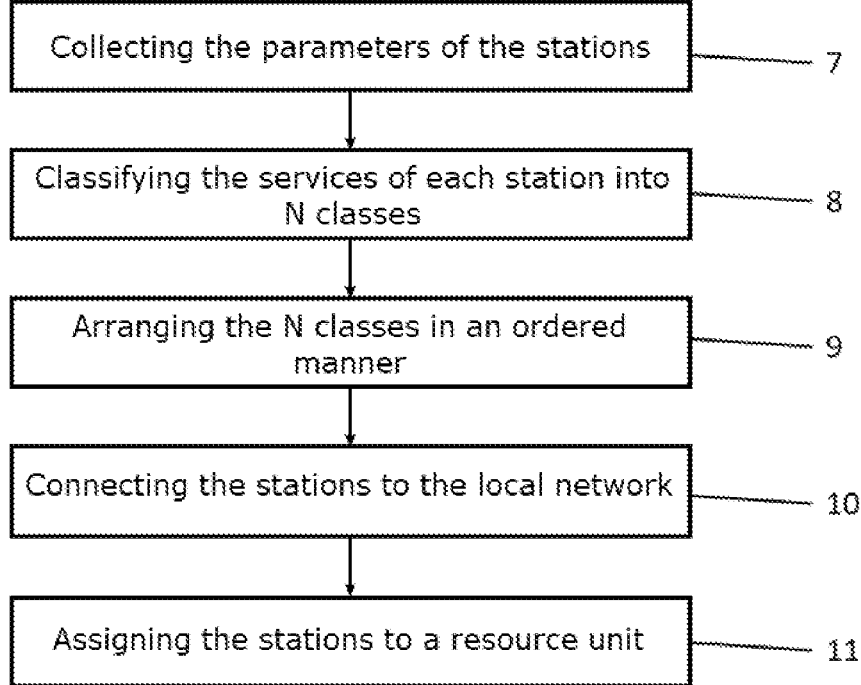

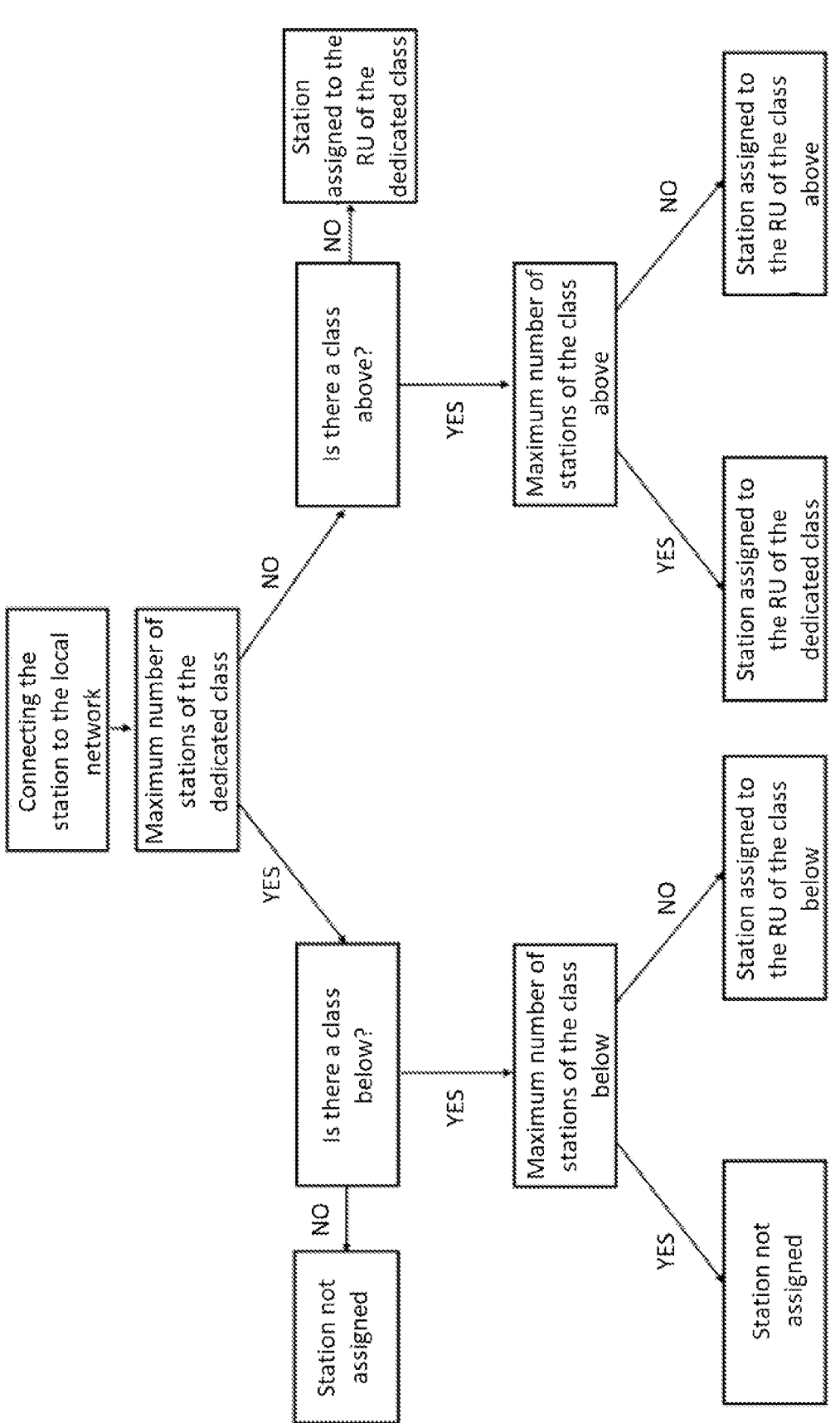
[Fig. 3]

[Fig. 4]
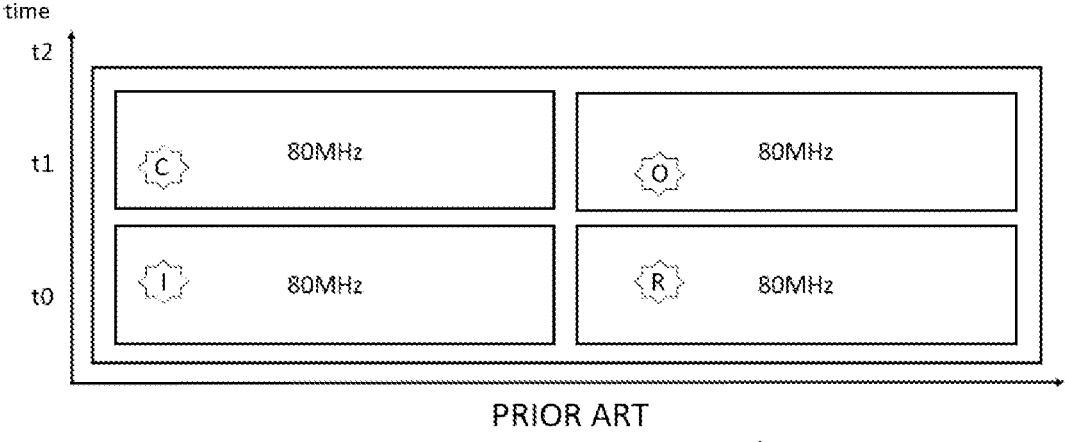
PRIOR ART
R   Wi-Fi repeater
C   Games console
O   Computer
I   IoT
[Fig. 5]
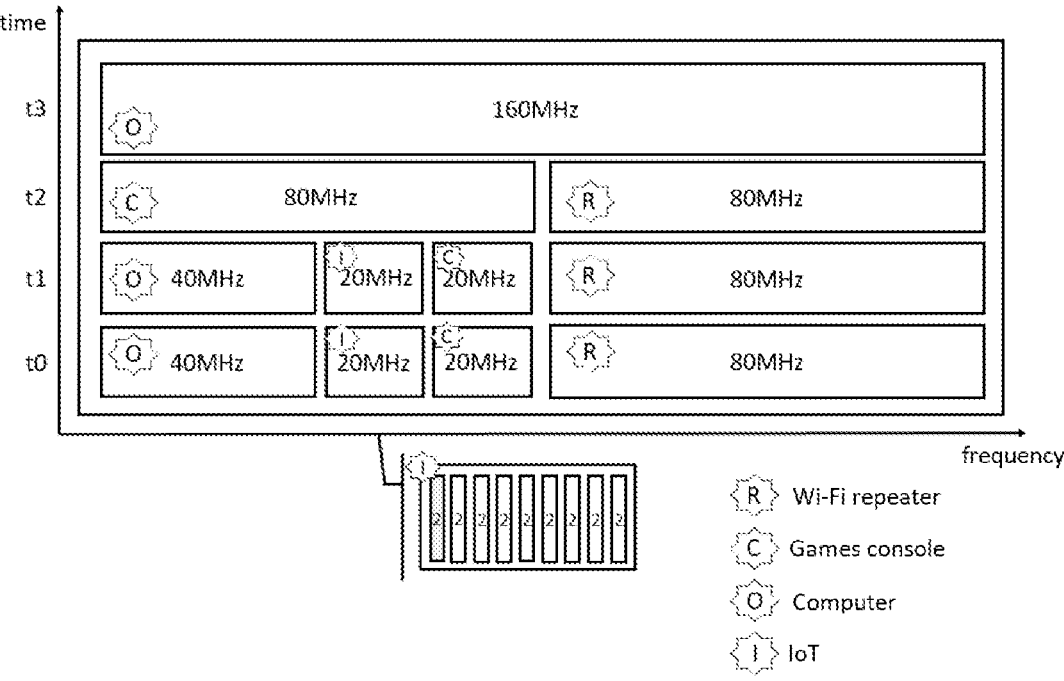
R   Wi-Fi repeater
C   Games console
O   Computer
I   IoT

METHOD AND GATEWAY FOR OPTIMIZED ALLOCATION OF STATIONS USING AN 802.11AX STANDARD

BACKGROUND

The present invention relates to a method for optimized allocation of stations using an 802.11ax standard in a local network. It also relates to a home gateway as well as a computer program for optimized allocation of stations in a local network.

Such a device makes it possible to plan the use of the frequency bands of a local network taking account of several parameters.

The complexity of home networks is increasing rapidly with respect to topology and to services provided. On the one hand, the topology of the home local network is evolving from a classic star topology around the home gateway to a tree or mesh topology that is more complex, due to the fact that there is an increasing number of items of equipment connected by means of varied and heterogeneous connectivity technologies. In addition to the proliferation of the items of user equipment, items of infrastructure equipment of the home network such as ethernet network switches, Wi-Fi adapters and repeaters, etc. are used in order to obtain coverage of the entire house. On the other hand, the home network provides varied services that are in competition with multiple client web applications, which potentially leads to quality-of-service problems. Moreover, only a few appliances of the home network such as the home gateway are controlled by the internet service provider (ISP), which renders the operation of management and supervision more difficult for the operator.

In a household, the access point behaves in an identical and neutral manner for allocating the frequency bands to the different stations of the house, regardless of the applications used.

Methods are known in the state of the art for prioritizing certain items of equipment with respect to others.

For example, the document EP2945332B1 discloses a method for allocating network bandwidth between two or more substantially heterogeneous uses. The method comprises: providing the available bandwidth; allocating a first part of the available bandwidth to the first use; and allocating a second part of the available bandwidth to the second use.

In addition, mechanisms exist such as "Wi-Fi multimedia (WMM)" which allows Wi-Fi networks to prioritize the traffic generated by different applications, or "Wi-Fi multimedia admission control" which allows the Wi-Fi networks to manage the network traffic as a function of the state of the channel, the network traffic load and the type of traffic. It is clear that these mechanisms function in a unitary manner on the 802.11n and 11ac technologies. However, these mechanisms lack precision, and the operation thereof appears difficult when it is a matter of prioritizing relatively a games console using video with a television set on which a video game is played.

Thus it is apparent that with certain services that cannot tolerate any fault, such as online gaming, it is often difficult to obtain a high level of satisfaction. Without dedicating the access point to a single critical use, users have no choice or effective solution.

The aim of the present invention is to make solutions available making it possible to improve flow rates. Another aim of the present invention is to produce a more optimum use of the frequency space.

SUMMARY

At least one aim of the invention is achieved with a method for optimized allocation of stations using an 802.11ax standard in a local network, this local network comprising at least one 802.11ax station implementing a service, a gateway for communicating with an external network and a detection device making it possible to detect the type of service used by the station, this method comprising the following steps:
collecting the parameters of the stations,
classifying the services of each station into N classes, each class containing at least one type of service; each class is assigned a resource unit and a maximum number of stations,
arranging the N classes in an ordered manner as a function of the size of the resource unit assigned to each class;
when a station connects to the local network:
identifying a class, referred to as dedicated class, corresponding to the service implemented by the station, identifying a higher class, for example directly above, the dedicated class if this higher class exists, and a lower class, for example directly below, the dedicated class if this lower class exists,
checking if the maximum number of stations is reached in the higher class, in the dedicated class, or in the lower class; assigning the station to the resource unit of the first class, in the order higher, dedicated then lower, not having reached the maximum number of stations; not assigning if the maximum number is reached in the three classes.

This method makes it possible to plan the use of the frequency band (assignment of resource units) by taking account of several additional data items which are: the station type (games consoles, tablets, smartphones, cameras), the type of application or service used by the station (web query, game, video, browsing) and the network topology (repeaters, frequency band used) making possible a more optimal use of the frequency space.

In fact, a local network topology can be taken into account for the assignment of stations to the different resource units.

The invention makes intelligent use of the possibilities given by the 802.11ax standard, in particular through the implementation of OFDMA, for better use of the passband and better distribution of the resource between the different stations.

The method optimizes this allocation of the stations to the resource units in order to improve the performance in terms of flow rate and latency. The user of the network obtains satisfaction without the need to understand or be involved in the technology, the configuration and/or the topology put in place.

Advantageously, the home gateway can dynamically calculate the class of the station. The class of the station is calculated based on the type of service used by the station. Dynamically calculating the class of the station makes it possible to increase the reactivity of the method but also to best adapt to the service used by the station during use thereof.

The collected parameters of the stations can be at least:
the brand
the model
the version of the operating system.

Each resource unit can correspond to a passband of different sizes. Advantageously, each resource unit can also correspond to a maximum passband, the station may or may not use the entire resource unit, depending on the service that it is using.

The gateway can be locally controlled so as to modify the parameters of the classes. The station can carry out a change of configuration during operation. The gateway can also allot a limited number of stations per class or deactivate classes. By "locally control" is meant the fact that the actions of the gateway can be carried out on the gateway locally by a technician intervening directly on the home gateway at the client's residence. By "locally control" is also meant the implementation of actions commanded by an internal processing unit of the home gateway.

The gateway can be dynamically controlled online so as to modify the parameters of the classes. By "dynamically" is meant the fact that during operation, the home gateway can take a set of decisions relating to the stations, their classes and their assignment to resource units. By "dynamically" is also meant the fact that the home gateway is controlled remotely by the client service operator for example.

As a result, a client service operator can, remotely or by sending a technician to the client's residence, configure a specific class for a station so as to respond to client dissatisfaction.

It is possible to envisage a complementary local control and online control, acting in parallel or one after another, as a function of time, as a function of the available resources in the gateway, or other.

The assignment of stations to the resource units can be periodic, the period having a configurable frequency comprised between 1 and 10 seconds. Periodic assignment makes it possible for the method to have the time to assess the impact of the assignment and as a result to avoid too many changes of resource unit for the stations. Advantageously, the period can be equal to 10 seconds.

The assignment of the stations to the resource units can be updated at each event and/or at each change of service of the station, which makes possible an optimum assignment of the stations to the different resource units during each period.

A station of the family of the repeaters can be assigned to a fixed class during its connection to the local network.

A repeater is a device making it possible to extend the coverage of the local network by transmitting the signal that it receives from the gateway to the stations connected thereto. Thus, with an assignment fixed during the connection of the repeater to the network according to the invention, this makes it possible to reduce the latency and increase the robustness of the link of the Wi-Fi stations connected to the repeater. According to a second aspect of the invention, a gateway is proposed for optimizing the allocation of stations in a local network, the gateway being equipped with a processing unit in order to implement the steps of the method.

According to a third aspect of the invention, a computer program product is proposed comprising instructions which, when the program is executed by the computer, cause the latter to implement the steps of the method.

BRIEF DESCRIPTION OF THE DRAWINGS

Other advantages and features of the invention will become apparent on reading the detailed description of implementations and embodiments that are in no way limitative, and from the following attached drawings:

FIG. 1 shows a wireless home local network according to the invention,

FIG. 2 shows a flowchart of the method for optimized allocation of stations according to the invention, FIG. 3 shows a flowchart of the assignment algorithm according to the invention, FIG. 4 shows a homogeneous distribution of the stations on a local network, FIG. 5 shows an optimized distribution of the stations on the local network according to the invention.

DETAILED DESCRIPTION

As these embodiments are in no way limitative, it is possible in particular to consider variants of the invention comprising only a selection of characteristics described or shown below, in isolation from the other characteristics described or shown (even if this selection is isolated within a sentence containing these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to provide a technical advantage or to distinguish the invention with respect to the state of the prior art.

Firstly, a wireless local home network 100 will be described with reference to FIG. 1. The centre of the network is a home gateway 1 distributing an internet connection to the different connected stations 2 in the home. The home gateway 1 is placed in the home, such as in the living room for example. The home gateway 1 is the central point of all the flows: images, music, videos, etc. Each station 2 is connected wirelessly via Wi-Fi or by an ethernet cable to the home gateway 1. The stations 2 use an 802.11ax standard in the local network 100. The home gateway 1 is connected, on one side to the local area network 4 or LAN, of the home and on the other side, to the external wide area network 5 or WAN. "Local network" 4 denotes any interconnected computerized installation or station 2 within the user's home, such as for example a television, a tablet, a mobile phone or also a games console. The external network 5 is connected to a remote collection system 3. The wireless home local network 100 also comprises a Wi-Fi repeater 12.

A method for optimized allocation of stations 2 using an 802.11ax standard in the local network 100 will now be described. Based on FIG. 1, the local network 100 comprises three stations 2 using an 802.11ax standard, each station 2 implementing a service. The home gateway 1 is equipped with a detection device 6 making it possible to detect the type of service used by the station 2 such as online gaming, videos, internet, audio or the use of a camera, for example, and of a device for detecting stations (not shown in FIG. 1). The gateway 1 comprises the configuration and the topology of the local network 100.

Generally, there is a main access point, the home gateway 1 and several secondary access points such as Wi-Fi repeaters 12, for example. In the case of several repeaters 12 connected in cascade for example, they use the same resource unit.

Based on FIG. 2, the method comprises the following steps:

collecting 7 the parameters of the stations 2,
    classifying 8 the services of each station 2 into N classes,
    arranging 9 the N classes in an ordered manner,
    connecting 10 the station 2 to the local network 4,
    assigning 11 the station 2 to a resource unit.

This procedure configuration is put in place when the stations 2 are already known by the home gateway 1, i.e. the stations 2 have already connected to the home gateway 1. As a result, the parameters of the stations 2 in question are already recorded in the home gateway 1.

In the event that the stations have never connected to the local network 4, the procedure comprises the same steps but in the following order:

connecting 10 the station 2 to the local network 4,
collecting 7 the parameters of the stations 2,
classifying 8 the services of each station 2 into N classes,
arranging 9 the N classes in an ordered manner,
assigning 11 the station 2 to a resource unit.

The parameters of the stations 2 such as the make, model, software or the version of the operating system for example are collected by the home gateway 1. The parameters collected during the first connection of the station 2 to the local network 4 are recorded in the gateway 1. The services used by the stations 2 are detected by the detection device 6, then classified into N classes. Each class contains at least one type of service. The class of the station 2 is calculated based on the service used by the station 2. Each class is assigned a resource unit and a maximum number of stations 2. The N classes are arranged as a function of the size of the resource unit assigned thereto. As an example, it is assumed six types of service are detected. A class is assigned to each service, therefore six classes are defined. A resource unit of different size is assigned to each class. Class six, i.e. the lowest class, is assigned to a resource unit of 2 MHZ, while class 1, i.e. the highest class, is assigned a resource unit of 80 MHz. The classes are therefore ordered as presented in the following table:

| Classes | RU (MHz) | Max. No. of stations |
|---------|----------|----------------------|
| 1 | 80 | 2 |
| 2 | 40 | 4 |
| 3 | 20 | 8 |
| 4 | 8 | 16 |
| 5 | 4 | 32 |
| 6 | 2 | 64 |

The parameters such as: the number of classes, the resource units or the maximum number of stations 2 per class are dynamically managed by the remote collection system 3.

An assignment algorithm assigns the stations 2 to the resource units of a first class when they connect to the local network 4 according to the flowchart shown in FIG. 3. A class corresponding to the service implemented by the station 2 is identified by the algorithm, this is the dedicated class. The algorithm also checks for the existence of a class directly above and a class directly below the dedicated class.

For example, according to Table 1, if the dedicated class is class four, the class directly above corresponds to class three and the class directly below corresponds to class five. A class that is higher than the dedicated class has a resource unit that is greater than that of the dedicated class. A class that is lower than the dedicated class has a resource unit that is smaller than that of the dedicated class.

Based on FIG. 3, the algorithm starts by checking the maximum number of stations 2 of the dedicated class. If the maximum number of stations 2 of the dedicated class has not been reached, the algorithm checks for the existence of a class directly above. In the event that there is no class directly above, the station 2 is assigned to the resource unit of the dedicated class. In the event that there is a class directly above the dedicated class, the algorithm checks the maximum number of stations 2 of the higher class. If the maximum number of stations of the higher class has been reached, the station 2 is assigned to the resource unit of the dedicated class; otherwise, if the maximum number of stations 2 of the higher class has not been reached, the station 2 is assigned to the resource unit of the higher class. Assignment of a station 2 to the resource unit of the class directly above is an option that can be configured. The option is activated by default so as to "fill" the entirety of the resource units in optimal manner. In the event that the option is not activated, the station 2 is assigned to the dedicated class and not to the class above. The option is deactivated only if the user requests this from the client service operator. Deactivation is carried out either locally by a technician on the home gateway 1, or dynamically, i.e. remotely by the client service operator.

If the maximum number of stations 2 of the dedicated class has been reached, the algorithm checks for the existence of a class directly below. In the event that there is no class directly below, the station 2 is not assigned to any resource unit. In the event that the station 2 is not assigned to any resource unit, the station 2 exits the algorithm and sending data is then carried out sequentially. In the event that there is a class directly below the dedicated class, the algorithm checks the maximum number of stations 2 of the lower class. If the maximum number of stations 2 of the lower class has been reached, the station is not assigned to any resource unit; otherwise, if the maximum number of stations 2 of the lower class has not been reached, the station 2 is assigned to the resource unit of the lower class.

If the maximum number of stations 2 of a class has been reached, this means that there is no more space for this resource unit as well as for the higher resource units.

In addition, a first station 2 which has been assigned to the resource unit of the class above only remains in this higher class during the current period. In fact, if a second station 2 of this higher class needs to be assigned to the corresponding resource unit and the maximum number of stations 2 of this higher class has been reached, then in the next period, the first station 2 is reassigned to the resource unit of its dedicated class. As a result, an assignment priority is put in place so as to manage the optimal allocation of the stations 2 to the resource units and allow each station 2 to be assigned to the resource unit best corresponding thereto according to the service used by the station.

The assignment is reassessed periodically, it is updated every 1 to 10 seconds. The assignment is also reassessed when an event occurs such as: joining or leaving of a station 2, a change of channel, at each change of service of a station 2 or "band steering". By "band steering" is meant the function of software making it possible to require a station 2 to change Wi-Fi access point. The "band steering" function is for example managed by the home gateway 1.

There are exceptions to this assignment. The Wi-Fi repeaters 12 or certain specific stations 2, such as a television decoder for example, are not affected by this classification and are assigned to a fixed resource unit throughout their use on the local network 4.

Based on FIGS. 4 and 5, four stations 2 belonging to four different classes are connected to the local network 4: a Wi-Fi repeater 12, a computer, a games console and an "internet of things" (IoT) item such as a virtual assistant station for example. In the example of FIGS. 4 and 5, seven classes are defined, such as in the following table:

| Classes | RU (MHz) | Max. No. of stations |
|---------|----------|----------------------|
| 1 | 160 | 1 |
| 2 | 80 | 2 |
| 3 | 40 | 4 |
| 4 | 20 | 8 |
| 5 | 8 | 16 |
| 6 | 4 | 32 |
| 7 | 2 | 64 |

In the case of FIG. 4, the home gateway 1 behaves as presented in the state of the art, i.e. in an identical and neutral manner for allocating the resource units to the stations 2 of the house, regardless of the applications or services used. In the absence of optimized planning, the distribution of the stations 2 is done homogeneously. Instances of overuse of the resource units are noted at t0, which increases the latency for the stations 2 that only want to transmit their data at t1.

By applying the optimal planning according to the invention, the distribution of the stations 2 by the home gateway 1 is carried out as shown in FIG. 5. At the first period t0, the computer transmits little data. The computer is assigned to class three, i.e. to the 40 MHz resource unit (see Table 2). The IoT equipment is assigned to class seven, i.e. to the 2 MHz resource unit. The games console is assigned to class four, i.e. to the 20 MHz resource unit and the Wi-Fi repeater 12 to class two, i.e. to an 80 MHz resource unit, as the Wi-Fi repeater 12 requires a high bandwidth.

At period t1, as the number of stations 2 associated with class seven is too low to fill the available nine 2 MHz spaces, the IoT station is automatically upgraded to the 20 MHz resource unit of class five so as to avoid having unused frequencies. The IoT station has the ability to be upgraded since the maximum number of stations 2 of class five has not been reached.

At period t2, a change of service on the games console is detected by the home gateway 1, which modifies the class thereof and therefore the size of the resource unit to which the console is assigned. The games console is therefore upgraded to class two, corresponding to an 80 MHz resource unit. At period t3, the home gateway 1 detects that the computer changes service. The computer is then assigned to a new class corresponding to the new service used. The new class of the computer is class one, which corresponds to the 160 MHz resource unit.

It is noted that the Wi-Fi repeater 12 is isolated and remains in its class throughout its use, reducing the latency and increasing the robustness of the link for the Wi-Fi stations connected thereto. A Wi-Fi repeater 12 or special station has priority.

The set of stations 2 have transmitted their data at t0 without user impact since the allocated resources are adapted to the types of stations and services. By adopting this type of frequency planning per station 2 and per service, use of the resource units made available is optimized.

In the event that the station 2 is not assigned to any resource unit, the station 2 exits the algorithm and the sending of data is then carried out sequentially. In the event of a sequential assignment, the size of the resource unit depends on the maximum capacities of the station 2 and is not determined by the algorithm according to the invention.

Sequential sending entails for example sending the data at t1 for the prioritized stations such as a repeater 12 for example (sending of the data at the same instance of time at to or t1 or t2), sending the data at t2 for a station that is not prioritized under the 802.11ax standard.

Typically, at least one of the means of the aforementioned device according to the invention, preferably each of the means of the aforementioned device according to the invention are technical means.

Typically, each of the means of the aforementioned device according to the invention can comprise at least one computer, a central processing or calculation unit, an analogue electronic circuit (preferably dedicated), a digital electronic circuit (preferably dedicated), and/or a microprocessor (preferably dedicated), and/or software means.

Of course, the invention is not limited to the examples which have just been described and numerous adjustments can be made to these examples without exceeding the scope of the invention.

Of course, the different characteristics, forms, variants and embodiments of the invention can be combined together in various combinations inasmuch as they are not incompatible or mutually exclusive. In particular all the variants and embodiments described above can be combined with each other.

The invention claimed is:

1. A method for optimized allocation of stations using an 802.11ax standard in a local network, said local network comprising at least one 802.11ax station implementing a service, a gateway for communicating with an external network and a detection device making it possible to detect a type of service used by the station, said method comprising the following steps:

collecting parameters of the stations;

classifying services of each station into N number of classes, each class containing at least one type of service, wherein N is equal to or greater than 1; each class is assigned a resource unit and a maximum number of stations; and arranging the N classes in an ordered manner as a function of the size of the resource unit assigned to each class;

when a station connects to the local network:

identifying a class, referred to as dedicated class, corresponding to the service implemented by the station, identifying a higher class than the dedicated class if this higher class exists, and a lower class than the dedicated class if this lower class exists; and checking if the maximum number of stations is reached in the higher class, in the dedicated class, or in the lower class; assigning the station to the resource unit of a first class, in an order higher class, a dedicated class, then a lower class, not having reached the maximum number of stations; and not assigning if the maximum number is reached in the three classes.

2. The method for optimized allocation of stations according to claim 1, in which a home gateway dynamically calculates the class of the station.

3. The method for optimized allocation of stations according claim 1, in which the collected parameters of the stations are at least:

a brand;

a model; and a version of an operating system.

4. The method for optimized allocation of stations according to claim 1, in which each resource unit corresponds to a passband of different sizes.

5. The method for optimized allocation of stations according to claim 1, in which the gateway is locally controlled so as to modify parameters of the classes.

6. The method for optimized allocation of stations according to claim 1, in which the gateway is dynamically controlled online so as to modify parameters of the classes.

7. The method for optimized allocation of stations according to claim 1, in which the assignment of the stations to the resource units is periodic, the period having a configurable frequency comprised between 1 and 10 seconds.

8. The method for optimized allocation of stations according to claim 1, in which the assignment of the stations to the resource units is updated at each event.

9. The method for optimized allocation of stations according to claim 1, in which the assignment of the stations to the resource units is updated at each change of service of the station.

10. The method for optimized allocation of stations according to claim 1, in which a station of a family of repeaters is assigned to a fixed class during its connection to the local network.

11. The method for optimized allocation of stations according to claim 1, in which a topology of the local network is taken into account for the assignment of the stations to the different resource units.

12. A gateway for optimizing the allocation of stations in a local network, the gateway being equipped with a processing unit in order to implement the steps of the method according to claim 1.

* * * * *